Sept. 9, 1969    R. C. NORRIE ET AL    3,466,104
RESILIENT MIDSHIP DRIVE-LINE BEARING
Filed Nov. 16, 1967
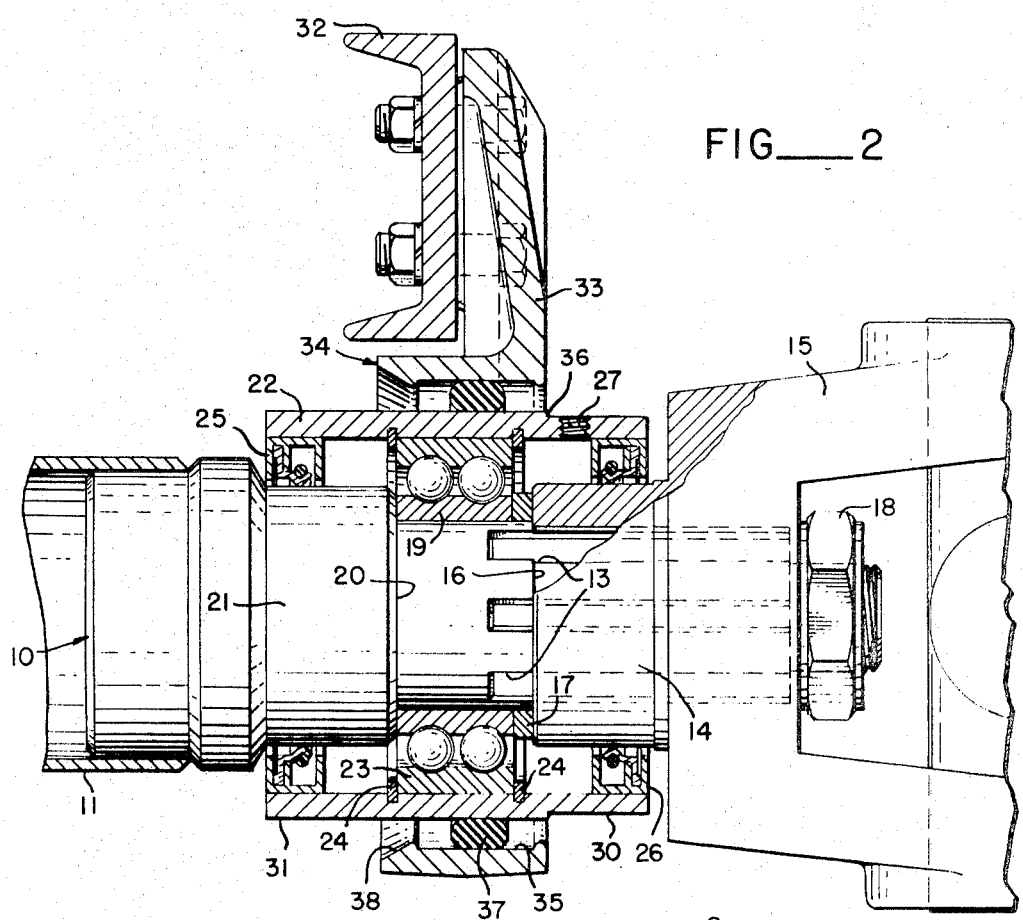
FIG__2
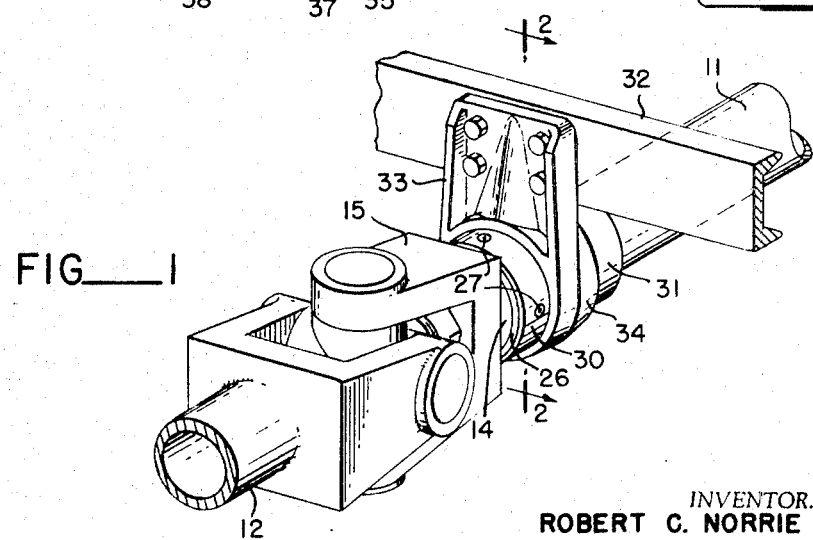
FIG__1
INVENTOR.
ROBERT C. NORRIE
PAUL A. TURVILL
BY
ATTORNEYS 3,466,104
RESILIENT MIDSHIP DRIVE-LINE BEARING
Robert C. Norrie, Seattle, and Paul A. Turvill, Des Moines, Wash., assignors to Pacific Car and Foundry Company, Renton, Wash., a corporation of Washington
Filed Nov. 16, 1967, Ser. No. 683,645
Int. Cl. F16c 27/00
U.S. Cl. 308—184                                                    7 Claims

ABSTRACT OF THE DISCLOSURE

A resilient midship drive-line bearing providing a bearing assembly in which the drive-line is journaled, with the bearing assembly housed within a lubricant-containing sleeve and the sleeve resiliently gripped within a frame-carried bracket by means of a deformed hard-rubber O-ring.

---

This invention relates to a resilient midship bearing for a vehicle drive line of the type employing multiple (three or more) joints. The object is to provide a bearing which can be applied to and removed from the drive-line and the vehicle with ease and expedition, which is simple and inexpensive to manufacture, which will be long lasting and trouble-free in its operation, and which will efficiently perform its intended functions of isolating vibrations from the vehicle frame and compensating the bearing to angular deflection of the drive-line occasioned by torque loading and the angles at which the universal joints of the drive-line operate.

These and other more particular objects and advantages of the invention will appear and be understood in the course of the following description and claims. The invention consists in the novel construction and in the adaptation and combination of parts hereinafter described and claimed.

In the accompanying drawing:

FIGURE 1 is a perspective view illustrating midship bearing constructed in accordance with preferred teachings of the present invention, and including in its functioning association therewith a fragmentary showing of a multiple-joint drive line.

FIGURE 2 is a longitudinal vertical sectional view thereof drawn to an enlarged scale on line 2—2 of FIG. 1.

Referring to said drawing, the numeral 10 indicates a spline stub shaft which lies between front and rear drive shafts 11 and 12, respectively, of a motor vehicle drive line assembly having at least three universal joints within its length. Two of the joints (not shown) lie one at the front end of the front drive shaft and the other at the rear end of the rear drive shaft. The third joint drive-couples the rear end of the stub shaft to the front end of the rear drive shaft the stub shaft, which is or may be a product of the Spicer division of Dana Corporation, has spline grooves 13 cut into a rear portion thereof for disconnectable mating engagement with internal splines presented by an extension 14 of the front yoke section 15 of said universal joint. The front end of the stub shaft is suitably welded to the rear end of the front drive shaft.

The stub shaft presents a rearwardly facing shoulder 20, and a cylindrical seat for the inner race 19 of a double-row ball or roller bearing is defined to the rear of such shoulder. A clamping nut 18 draws the nose of the extension 14 against a spacer 17 which lies to the rear of said inner race and bears against the same. Forwardly from the shoulder 20 there is defined a cylindrical neck section 21 characterized in that its diameter corresponds to that of a cylindrical exterior surface presented by said extension 14 of the universal joint.

A sleeve 22 surrounds the bearing to function as a housing therefor, holding the outer race 23 between retaining rings 24. Front and rear end prolongations of the housing sleeve overlie said neck section 21 and said joint extension 14, and there is fitted in said prolongations for wiping engagement with the neck section and the joint extension a respective oil seal, as 25 and 26. Tapped "fill" and "level" openings for a respective one of two removable plugs 27 are provided in one side and the top of one of the prolongations, communicating with the interior oil chamber which is defined between the oil seals. Other than for a short necked-down portion 30 at the rear, the exterior surface 31 of the housing sleeve is cylindrical and of uniform diameter.

A cross-member 32 of the vehicle frame overlies the housing sleeve and there is bolted or otherwise secured to this cross-member a bracket 33. Presented by the bracket is an annular mounting head 34, shorter in length than the length of the housing sleeve 22 and arranged to co-axially surround the sleeve in a position centered, or approximately centered, between the two ends thereof. The mounting head has an internally tapered nose at the front producing a mouth giving access, for an O-ring 37, to a chamber defined at the inside by the exterior surface 31 of the housing sleeve and at the outside by an interior wall 35 of the head spaced from and paralleling said exterior surface. Said exterior surface 31 and the inner wall 35 may suitably have diameters of 4½″ and 5¼″, respectively, thus giving to the intervening space a width of ⅜″. The O-ring is desirably ½″ in width with a 4″ internal diameter. A suitable material for its composition is neoprene of 60 Durometer hardness.

When installing the O-ring the bracket is unbolted from the cross-member of the frame and backed off the housing sleeve. The installation is perforce performed with the universal yoke section 15 disconnected from the spline stub shaft 10. The O-ring is slipped onto the necked-down portion 30 of the sleeve and fed forwardly thereon to the shoulder 36 which separates such portion from the surface 31. The bracket is now applied to the rear of the O-ring, placing the mounting head so that the internal taper 38 lies square to the O-ring and bears thereon, whereupon the bracket is pushed along the housing sleeve into the centered position in which it is illustrated in the drawing. The O-ring partakes of a rolling deformation as the same responsively works through the access mouth of the mounting head from the tapered surface into the flexing pocket defined between the paralleling walls 31 and 35, compression pressure upon the O-ring being initiated by the taper and progressively increased along the length thereof.

In the described center bearing it will be seen that the bearing remains co-axial with the shaft under all conditions. Superior thrust support is obtained by reason of the employment of double balls, and there is also the advantage of maintaining the seals in line with the shaft. Radial stiffness is achieved by the compression of the hard rubber O-ring. Such O-ring is perforce self-aligning.

It is here noted that oil seals can be eliminated, if desired, by the use of a sealed bearing.

It is thought that the invention and the manner of its operation will be clear from the foregoing.

The embodiments of the invention in which an exclusive property or privilege is claimed are defined as follows:

1. A resilient mounting for giving midship support from a vehicle frame member to a vehicle drive-line, comprising: a frame-carried bracket providing an annular mounting head having a cylindrical inner wall and open at both ends, a sleeve received in spaced concentricity within said head, a bearing assembly mounted within the sleeve and producing a journal for a midship portion of the drive-line, and an O-ring occupying said space between the mounting head and the sleeve, the O-ring being formed of a rubber-like material which is substantially incompressible but readily deformable and when undeformed having an internal diameter moderately less than the exterior surface of the sleeve and a cross-sectional width somewhat greater than the radial width of said occupied space, said space having a length such that the O-ring, in addition to the deformation reflecting said constricted radial width, is free to partake of deformation in compensation of dimensional stacking or as may be caused by angular disarrangement of the sleeve relative to the mounting head.

2. A resilient mounting according to claim 1 in which the bearing assembly comprises inner and outer races with a contained double set of balls.

3. A resilient mounting according to claim 1 in which the sleeve is prolonged by each of its ends beyond the bearing assembly and has oil seals fitted in said ends in wiping engagement with components of the drive-line.

4. A resilient mounting according to claim 3 in which an oil chamber substantially larger than the bearing assembly is defined within the sleeve between the two oil seals, fill and level openings being provided in the sleeve which communicate with said chamber and are each fitted with a removable plug.

5. A resilient mounting according to claim 1 in which one end opening of the head flares in an outward direction to provide an access mouth into which the O-ring is introduced as an assembling step performed incident to bringing the O-ring into the space which it occupies in the assembled mounting, the tapered wall provided by said flare causing the O-ring to roll and be progressively deformed upon giving to the sleeve such as endwise motion relative to the head as walks the O-ring inwardly along said taper.

6. A resilient mounting according to claim 5 in which the sleeve presents an end portion with an external diameter approximating the internal diameter of the undeformed O-ring and separated by a shoulder from the sleeve surface which receives the deformed O-ring, the shoulder initiating the rolling deformation of the O-ring as the sleeve is given said endwise motion relative to the head.

7. A resilient mounting according to claim 3 in which said supported midship portion of the drive-line comprises a stub shaft welded by its front end to the rear end of a front drive shaft and splined by its rear end to an extension of the front yoke section of a universal joint fixed to the front end of a rear drive shaft, the rear oil seal wiping said extension, the front oil seal wiping a front portion of the stub shaft having a diameter corresponding to that of the extension, the bearing assembly fitting a center portion of the stub shaft necked down from said portion wiped by the front oil seal.

References Cited
UNITED STATES PATENTS

| | | | |
|---|---|---|---|
| 2,102,415 | 12/1937 | Herreshott | 308—184 |
| 2,155,919 | 4/1939 | Wooler et al. | 308—184 |
| 2,523,983 | 9/1950 | Arms | 308—184 |
| 2,933,354 | 4/1960 | Primeau | 308—184 |
| 3,323,845 | 6/1967 | Buck | 308—184 |

FOREIGN PATENTS

| | | |
|---|---|---|
| 575,839 | 4/1924 | France. |

MARTIN P. SCHWADRON, Primary Examiner

F. SUSKO, Assistant Examiner